(12) United States Patent
Lee et al.

(10) Patent No.: US 11,989,054 B2
(45) Date of Patent: May 21, 2024

(54) FOLDABLE DISPLAY DEVICE

(71) Applicant: LG DISPLAY CO., LTD., Seoul (KR)

(72) Inventors: Gyu-Ho Lee, Paju-si (KR); Mi-Yeon Seo, Paju-si (KR); Sin-Chul Kang, Paju-si (KR); Suk Choi, Paju-si (KR); Moo-Jin Kwak, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/885,014

(22) Filed: Aug. 10, 2022

(65) Prior Publication Data

US 2023/0161377 A1    May 25, 2023

(30) Foreign Application Priority Data

Nov. 22, 2021 (KR) .................. 10-2021-0161540

(51) Int. Cl.
*G06F 1/16* (2006.01)

(52) U.S. Cl.
CPC .................. *G06F 1/1616* (2013.01)

(58) Field of Classification Search
CPC .... G06F 1/1616; G06F 1/1641; G06F 1/1652; H04M 1/0222; H04M 1/0268; G09F 9/301; G02F 1/133305; G02F 1/133331; H10K 50/84; H10K 77/111
See application file for complete search history.

(56) References Cited

U.S. PATENT DOCUMENTS

| | | | | |
|---|---|---|---|---|
| 10,541,373 | B2* | 1/2020 | Park | H10K 50/84 |
| 10,916,719 | B2* | 2/2021 | Park | G02F 1/133305 |
| 11,108,014 | B2* | 8/2021 | Ha | H10K 50/8426 |
| 11,204,628 | B2* | 12/2021 | Paek | G06F 1/1652 |
| 11,508,268 | B2* | 11/2022 | Lee | G09F 9/301 |
| 2019/0131553 | A1* | 5/2019 | Park | H04M 1/0268 |
| 2019/0132987 | A1* | 5/2019 | Koo | H05K 7/18 |
| 2020/0051881 | A1* | 2/2020 | Park | B32B 3/04 |
| 2020/0209925 | A1* | 7/2020 | Paek | G06F 1/1652 |
| 2020/0251679 | A1* | 8/2020 | Ha | B32B 3/085 |
| 2020/0257335 | A1* | 8/2020 | Kim | G06F 1/1641 |
| 2022/0039274 | A1* | 2/2022 | Shin | G06F 1/1618 |
| 2022/0058991 | A1* | 2/2022 | Lee | H10K 77/111 |
| 2022/0093012 | A1* | 3/2022 | Lee | G09F 9/301 |
| 2022/0206528 | A1* | 6/2022 | Myung | G06F 1/1618 |
| 2023/0078056 | A1* | 3/2023 | Lee | G06F 1/1641 |
| 2023/0161377 | A1* | 5/2023 | Lee | G06F 1/1641 |
| | | | | 361/679.01 |

FOREIGN PATENT DOCUMENTS

| | | | |
|---|---|---|---|
| KR | 10-2019-0049240 A | 5/2019 | |
| KR | 10-2020-0019000 A | 2/2020 | |

* cited by examiner

*Primary Examiner* — Lisa Lea-Edmonds
(74) *Attorney, Agent, or Firm* — Morgan, Lewis & Bockius LLP

(57) ABSTRACT

A foldable display device may include: a display panel displaying an image; a cover window over the display panel; and a back plate under the display panel. The back plate may include a plate top having a plurality of holes, a plate bottom having at least one groove corresponding to the plurality of holes, and an adhesive layer attaching the plate top and the plate bottom.

16 Claims, 11 Drawing Sheets

FIG. 9

| in-folding(3R)/out-folding(5R) | Ref. | A | B | C | D | E | F |
|---|---|---|---|---|---|---|---|
| width(mm) of hole area | 0 | 1.1 | 2.9 | 4.3 | 5.9 | 9.89 | 15.89 |
| tensile strain(%) of folding shoulder area of cover window | 0.1 | 0.04 | 0 | 0 | 0 | 0.05 | 0.07 |
| maximum strain(%) of transparent adhesive | 133 | 113 | 112 | 112 | 113 | 117 | 119 |
| rendering of omega shape | X | △ | ○ | ○ | ○ | △ | △ |

FOLDABLE DISPLAY DEVICE

CROSS-REFERENCE TO RELATED APPLICATION

The present application claims the benefit of and priority to Korean Patent Application No. 10-2021-0161540 filed on Nov. 22, 2021, the entirety of which is incorporated herein by reference for all purposes.

BACKGROUND

1. Technical Field

The present disclosure relates to a display device and particularly to, for example, without limitation, a foldable display device.

2. Discussion of the Related Art

As an information-oriented society progresses, a demand for a display device displaying an image has increased in various forms. In a display device field, a cathode ray tube (CRT) having a relatively large volume has been rapidly replaced by a flat panel display (FPD) device having a thin profile, a light weight and a low power consumption and applicable to a relatively large size. The FPD devices may include a liquid crystal display (LCD) device, a plasma display panel (PDP), an organic light emitting diode (OLED) display device, and a field emission display (FED) device.

Further, a flexible display device capable of being folded and unfolded freely by forming a transistor and a conductive line on a flexible substrate has been the subject of a next generation display device.

The flexible display device may be classified into a foldable display device, a bendable display device, and a rollable display device.

Further, the foldable display device may have an in-folding type where a display surface is hidden inside when folded and an out-folding type where a display surface is exposed outside when folded. In general, the foldable display device may have a unidirectional folding type where only one of the in-folding and the out-folding is steadily performed.

As a result, the foldable display device of a bidirectional folding type where the in-folding and the out-folding are selectively performed in the same folding area has been researched and developed. In the bidirectional type, since the in-folding and the out-folding opposite to each other are performed, a reproduction accuracy of a folding shape is reduced.

For example, an abnormal folding shape of the out-folding may be observed due to deformation of the in-folding having an omega shape, or an abnormal omega shape of the in-folding may be observed due to deformation of the out-folding.

The description provided in the discussion of the related art section should not be assumed to be prior art merely because it is mentioned in or associated with that section. The discussion of the related art section may include information that describes one or more aspects of the subject technology.

SUMMARY

The inventors of the present disclosure have recognized the problems and disadvantages of the related art, have performed extensive research and experiments, and developed a new invention. Accordingly, one or more embodiments of the present disclosure are directed to a foldable display device that substantially obviates one or more of the problems due to limitations and disadvantages of the related art.

Furthermore, one or more embodiments of the present disclosure provide a bidirectional foldable display device where a transfer of a deformation due to a folding stress to a display panel may be minimized, and a reproduction accuracy of a folding shape may be improved by forming a plurality of holes in a plate top of a back plate and forming at least one groove in a plate bottom of the back plate.

In addition, one or more embodiments of the present disclosure provide a foldable display device where a precise omega shape of an in-folding may be obtained and a stress of a folding shoulder area may be minimized by adjusting widths of a hole area, an in-folding area and an out-folding area of a back plate.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the appended drawings.

To achieve these and other advantages of the present disclosure, as embodied and broadly described herein, in one or more aspects, a foldable display device may include: a display panel displaying an image; a cover window over the display panel; and a back plate under the display panel. The back plate may include a plate top having a plurality of holes, a plate bottom having at least one groove corresponding to the plurality of holes, and an adhesive layer attaching the plate top and the plate bottom.

In another aspect, a foldable display device may include: a display panel displaying an image; a plate top under the display panel, the plate top including a plurality of holes; and a plate bottom under the plate top, the plate bottom including at least one groove corresponding to the plurality of holes, wherein the plate top and the plate bottom may have a cross-section of an omega shape in an in-folding operation where a display surface of the display panel is hidden inside with reference to a folding axis, and wherein the plate top and the plate bottom may have a cross-section of a U shape in an out-folding operation where the display surface of the display panel is exposed outside with reference to the folding axis.

In another aspect, a foldable display device may include: a display panel configured to display an image; and a back plate under the display panel, the back plate including: a plate top having a plurality of holes disposed in a hole area; a plate bottom having a plurality of grooves disposed in a groove area; and an adhesive layer bonding the plate top and the plate bottom, wherein the foldable display device performs bidirectional folding with respect to a folding axis.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

In the drawings:

FIG. 9 is a table showing rendering of an omega shape according to widths of a hole area of a back plate of a foldable display device according to a first example embodiment of the present disclosure;

DETAILED DESCRIPTION

Figure 1:
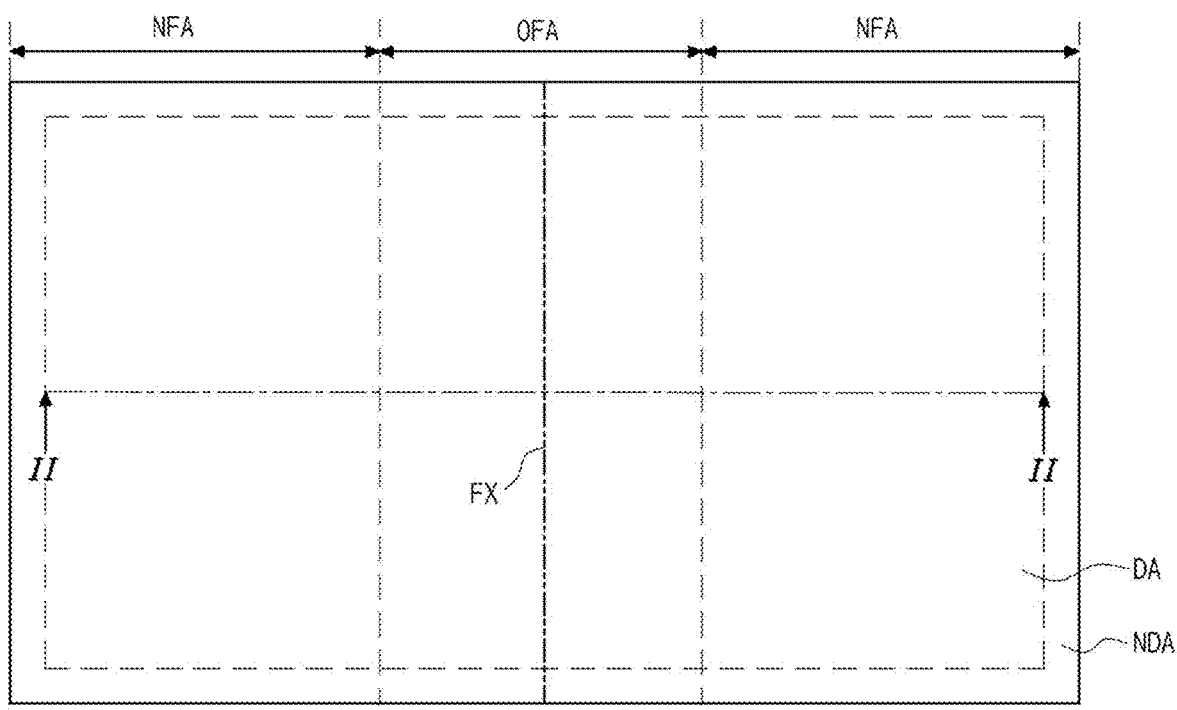
FIG. 1 is a plan view showing a foldable display device according to a first example embodiment of the present disclosure.

Reference is now be made in detail to aspects of the present disclosure, examples of which may be illustrated in the accompanying drawings. In the following description, when a detailed description of well-known functions or configurations may unnecessarily obscure aspects of the present disclosure, the detailed description thereof may be omitted. The progression of processing steps and/or operations described is an example; however, the sequence of steps and/or operations is not limited to that set forth herein and may be changed, with the exception of steps and/or operations necessarily occurring in a particular order. Like reference numerals refer to like elements throughout unless stated otherwise. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through following example embodiments described with reference to the accompanying drawings. The present disclosure may, however, be embodied in different forms and should not be construed as limited to the example embodiments set forth herein. Rather, these example embodiments are provided so that this disclosure is thorough and complete and fully conveys the scope of the present disclosure to those skilled in the art. Furthermore, the present disclosure is only defined by claims and their equivalents.

The shapes, sizes, areas, ratios, angles, numbers, and the like disclosed in the drawings for describing embodiments of the present disclosure are merely examples, and thus, the present disclosure is not limited to the illustrated details.

When the term "comprise," "have," "include," "contain," "constitute," "make up of," "formed of," or the like is used, one or more other elements may be added unless a term such as "only" or the like is used. The terms of a singular form may include plural forms unless the context clearly indicates otherwise. The word "exemplary" is used to mean serving as an example or illustration. Any implementation described herein as an "example" is not necessarily to be construed as preferred or advantageous over other implementations.

In construing an element, the element is construed as including an error or tolerance range even where no explicit description of such an error or tolerance range is provided.

Where positional relationships are described, for example, where the positional relationship between two parts is described using "on," "over," "under," "above," "below," "beneath," "near," "close to," or "adjacent to," "beside," "next to," or the like, one or more other parts may be located between the two parts unless a more limiting term, such as "immediate(ly)," "direct(ly)," or "close(ly)," is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, when the temporal order is described as, for example, "after," "subsequent," "next," "before," "preceding," "prior to," or the like, a case that is not continuous may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure.

In describing elements of the present disclosure, the terms "first," "second," "A," "B," "(a)," "(b)," or the like may be used. These terms are merely for differentiating one element from another element, and the essence, sequence, order, or number of a corresponding element should not be limited by these terms.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

In one or more aspects, the terms "between" and "among" may be used interchangeably simply for convenience. For example, an expression "between a plurality of elements" may be understood as between a plurality of elements or among a plurality of elements. For example, an expression "among a plurality of elements" may be understood as between a plurality of elements or among a plurality of elements. In one or more examples, the number of elements may be two. In one or more examples, the number of elements may be more than two.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

Reference is now made to the present disclosure, examples of which are described in detail with reference to the accompanying drawings. In adding reference numerals to elements of each of the drawings, although the same elements may be illustrated in other drawings, like reference numerals may refer to like elements unless stated otherwise. In addition, for convenience of description, a scale, size, and thickness of each of the elements illustrated in the accompanying drawings may differ from an actual scale, size, and thickness, and thus, embodiments of the present disclosure are not limited to a scale, size, and thickness illustrated in the drawings.

Figure 2:
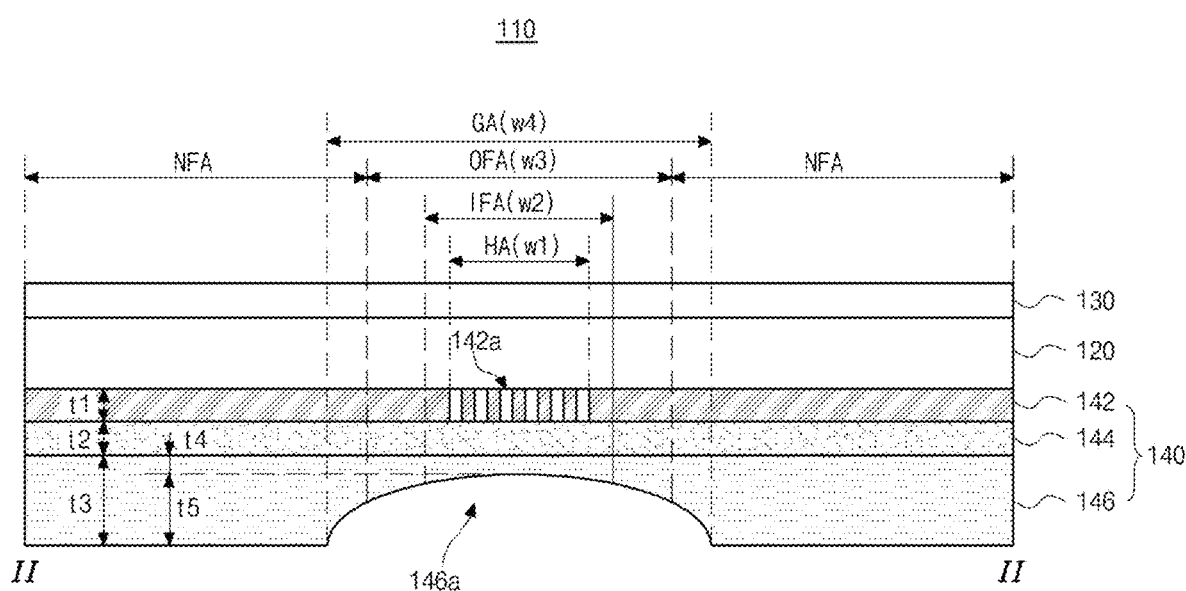
FIG. 2 is an example of a cross-sectional view taken along a line II-II of FIG. 1.

FIG. 1 is a plan view showing a foldable display device according to a first example embodiment of the present disclosure, and FIG. 2 is an example of a cross-sectional view taken along a line II-II of FIG. 1.

In FIGS. 1 and 2, a foldable display device 110 according to a first example embodiment of the present disclosure includes a display panel 120, a cover window 130 and a back plate 140.

The foldable display device 110 may selectively perform an in-folding operation where a display surface of an upper surface of the display panel 120 is hidden inside with respect to a folding axis FX and an out-folding operation where the display surface of the display panel 120 is exposed outside with respect to the folding axis FX.

The foldable display device 110 may include an in-folding area IFA which is a bending portion of the in-folding operation, an out-folding area OFA which is a bending portion of the out-folding operation, and a non-folding area NFA which is a non-bending portion of the in-folding operation and the out-folding operation and is disposed outside the out-folding area OFA.

For example, a second width w2 of the in-folding area IFA along a direction perpendicular to the folding axis FX may be smaller than a third width w3 of the out-folding area OFA along the direction perpendicular to the folding axis FX. (w2<w3)

The display panel 120 may display an image using a plurality of pixels and may include a gate line, a data line, a thin film transistor, and a capacitor.

The display panel 120 may include a display area DA for displaying an image and a non-display area NDA surrounding the display area DA.

For example, the display panel 120 may include an organic light emitting diode panel or a liquid crystal panel.

When the display panel 120 is an organic light emitting diode panel, each pixel may include a switching thin film transistor, a driving thin film transistor, a storage capacitor and a light emitting diode. When the display panel 120 is a liquid crystal panel, each pixel may include a thin film transistor, a storage capacitor and a liquid crystal capacitor.

The cover window 130 may be disposed on the display panel 120 and protect the display panel 120 from an external impact, an external moisture and an external heat. The cover window 130 may include a glass or a plastic such as polymethylmethacrylate (PMMA), polyimide (PI) and/or polyethyleneterephthalate (PET).

Although not shown, a transparent adhesive layer and a polarizing layer may be disposed between the display panel 120 and the cover window 130.

The back plate 140 may support the display panel 120 and protect the display panel 120 from an external impact, an external moisture and an external heat. The back plate 140 may include a plate top 142, an adhesive layer 144 and a plate bottom 146 sequentially disposed under the display panel 120.

The plate top 142 may increase flexibility of the entire back plate 140. A first thickness t1 of the plate top 142 may be smaller than a third thickness t3 of the plate bottom 146.

The plate top 142 may include a plurality of holes 142a symmetrically disposed with respect to the folding axis FX in a hole area HA. The hole area HA may produce the in-folding area IFA which has a rigidity relatively lower than the non-folding area NFA due to the plurality of holes 142a and is bent during the in-folding operation.

As a result, the in-folding area IFA may have an omega (Ω) shape during the in-folding operation by adjusting the first width w1 of the hole area HA, and a stress in a folding shoulder area FSA (of FIG. 3A) which is a portion of a maximum tensile force may be minimized.

A first width w1 of the hole area HA along the direction perpendicular to the folding axis FX may be smaller than the second width w2 of the in-folding area IFA along a direction perpendicular to the folding axis FX. (w1<w2)

For example, the first thickness t1 of the plate top 142 may be within a range of about 10 μm to about 100 μm (preferably, a range of about 10 μm to about 30 μm).

When the first thickness t1 of the plate top 142 is greater than about 100 μm, the folding stress may increase and the plurality of holes 142a may be visible or seen from a front of the display panel 120. When the first thickness t1 of the plate top 142 is smaller than about 10 μm, a constraint effect of deformation of the in-folding area IFA may be reduced.

For example, the plate top 142 may include a stainless steel, an amorphous metal, an amorphous silicon, an invar, a laminate thereof, an alloy thereof and/or a plating thereof.

The stainless steel may be formed by alloying iron (Fe) with chromium (Cr) and nickel (Ni) for improving a corrosion resistance of iron (Fe). The stainless steel may selectively include nickel (Ni) according to a kind thereof, and elasticity of the stainless steel may be adjusted according to a composition ratio of chromium (Cr).

The stainless steel may be classified into an iron-chromium group ferrite stainless steel and an iron-nickel-chromium group austenite stainless steel.

The amorphous metal may be formed by coagulating metallic atoms arranged formlessly like a glass or a liquid. When a metallic material is rapidly cooled down, the amorphous metal is formed due to obstruction of a crystal growth. The amorphous metal may have a corrosion resistance and an elasticity superior to the crystalline metal.

The amorphous silicon has an irregularity similar to the amorphous metal. The amorphous silicon may have an elasticity superior to the amorphous metal.

The invar is an alloy of iron (Fe) and nickel (Ni) and has an excellent corrosion resistance and an excellent tensile strength. The invar may be compared with the stainless steel according to whether chromium (Cr) is contained or not.

The stainless steel and the invar may have an excellent rigidity, and the amorphous metal and the amorphous silicon may have an excellent elasticity. The degree of internal bonding and the rigidity may be controlled by adjusting the composition ratio of the metallic alloy or the cooling speed.

The adhesive layer 144 may attach the plate top 142 and the plate bottom 146. For example, the adhesive layer 144 may include a curable resin such as an epoxy resin, a silicon resin, a polyester resin, a polyurethane resin and/or a phenol resin.

For example, a second thickness t2 of the adhesive layer 144 may be within a range of about 5 μm to about 100 μm (preferably, a range of about 15 μm to about 50 μm).

When the second thickness t2 of the adhesive layer 144 is greater than about 100 μm, the stress of the plate top 142 is not alleviated in a reliable manner. When the second thickness t2 of the adhesive layer 144 is smaller than about 5 μm, an adhesion between the plate top 142 and the plate bottom 146 is reduced and deterioration such as detachment due to the folding stress may occur.

The plate bottom 146 may include at least one groove 146a symmetrically disposed in a groove area GA with respect to the folding axis FX. The groove area GA may have a relatively low rigidity as compared with the non-folding area NFA due to the at least one groove 146a and may produce the out-folding area OFA which is bent during the out-folding operation.

Accordingly, an appearance (or visibility) of a border between the non-folding area NFA and the out-folding area OFA during the out-folding operation may be suppressed by adjusting a fourth width w4 of the groove area GA, and an elasticity may be added to the back plate 140 during the out-folding operation by adjusting a fourth thickness t4 of the plate bottom 146 of a central portion of the groove area GA.

The fourth width w4 of the groove area GA along the direction perpendicular to the folding axis FX may be equal to or greater than the third width w3 of the out-folding area OFA along the direction perpendicular to the folding axis FX and may be equal to or smaller than 1.2 times of the third width w3 of the out-folding area OFA (w3≤w4≤(1.2)*w3). A boundary of the groove area GA where the at least one groove 146a begins may be disposed in the non-folding area NFA.

When the fourth width w4 of the groove area GA is smaller than the third width w3 of the out-folding area OFA, the border between the non-folding area NFA and the out-folding area OFA may be visible or seen. When the fourth width w4 of the groove area GA is greater than 1.2 times of the third width w3 of the out-folding area OFA, an impact resistance property and a reliability may be deteriorated.

For example, the third thickness t3 of the plate bottom 146 may be within a range of about 10 μm to about 200 μm (preferably, a range of about 50 μm to about 120 μm).

When the third thickness t3 of the plate bottom 146 is greater than about 200 μm, a thickness of the foldable display device 110 increases. When the third thickness t3 of the plate bottom 146 is smaller than about 10 μm, the border between the out-folding area OFA and the non-folding area NFA may be visible or seen.

The fourth thickness t4 of the plate bottom 146 of the central portion of the groove area GA (a minimum thickness of the plate bottom 146) may be equal to or smaller than a fifth thickness t5 of a maximum depth of the at least one groove 146a of the central portion of the groove area GA. (t4≤t5)

When the fourth thickness t4 is greater than the fifth thickness t5, the border between the out-folding area OFA and the non-folding area NFA may be visible or seen due to the stress of the out-folding operation.

The plate bottom 146 may include a material having a relatively high elastic modulus. For example, the plate bottom 146 may include the same type of material as the plate top 142 but in a different alloy composition ratio.

The in-folding operation and the out-folding operation of the foldable display device 110 will be illustrated further with reference to drawings.

Figure 3A:
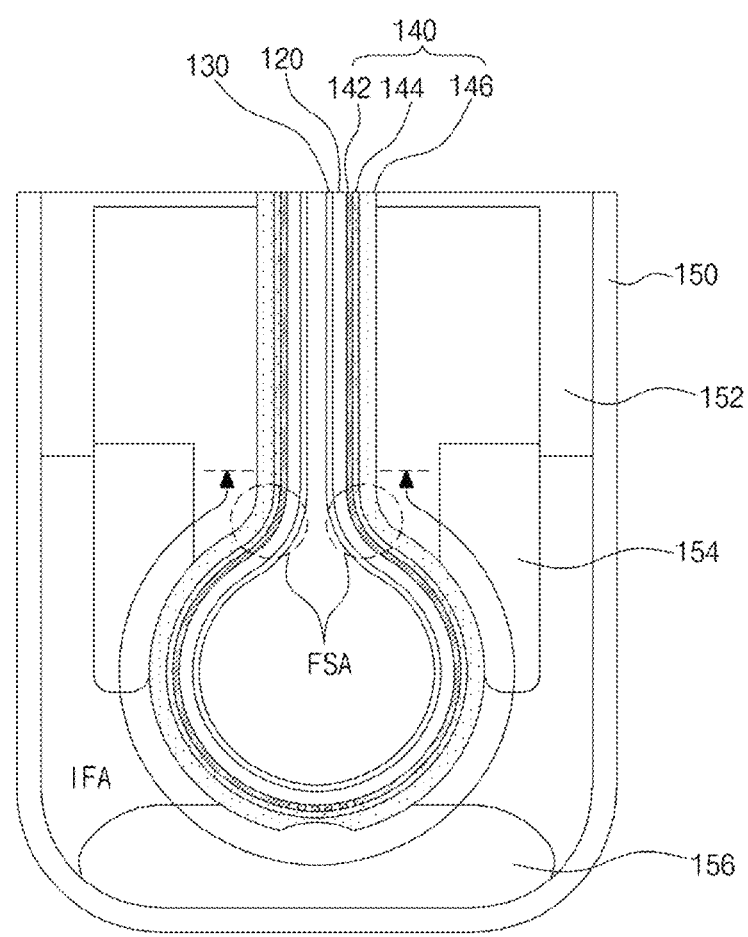
FIGS. 3A and 3B are examples of cross-sectional views showing an in-folding operation and an out-folding operation, respectively, of a foldable display device according to a first example embodiment of the present disclosure.
Figure 3B:
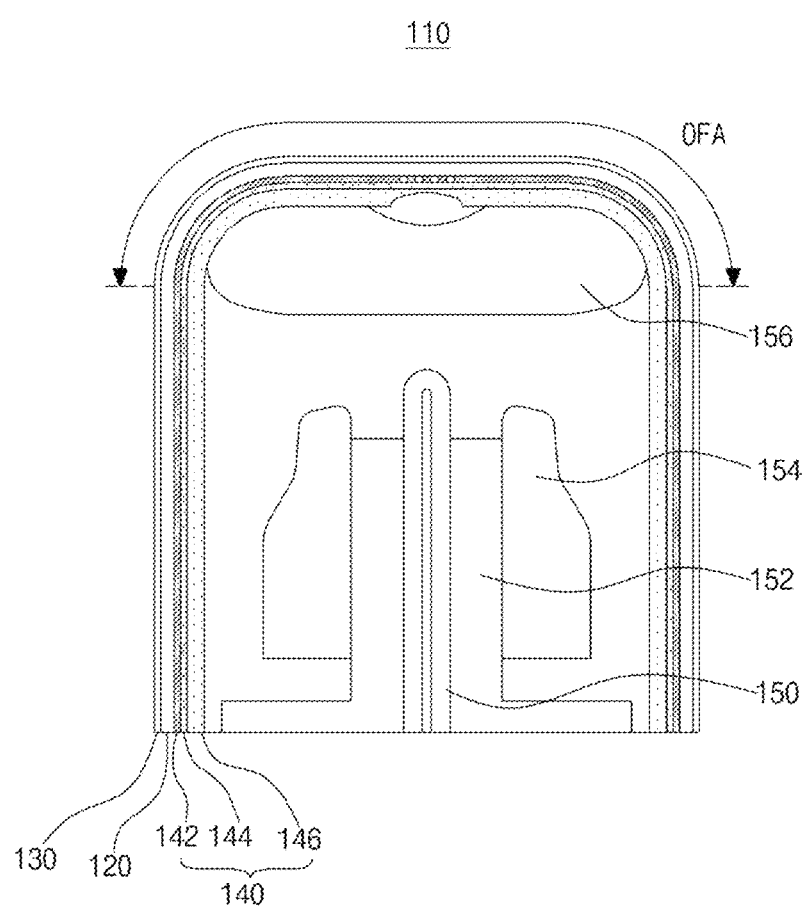

FIGS. 3A and 3B are examples of cross-sectional views showing an in-folding operation and an out-folding operation, respectively, of a foldable display device according to a first example embodiment of the present disclosure.

In FIGS. 3A and 3B, the foldable display device 110 according to a first example embodiment of the present disclosure may include the display panel 120, the cover window 130, the back plate 140, a case 150 and first, second and third guides 152, 154 and 156.

The first, second and third guides 152, 154 and 156 may be disposed between the back plate 140 and the case 150 and support the back plate 140 during the in-folding operation and the out-folding operation.

In FIG. 3A, during the in-folding operation where the display surface of the display panel 120 is hidden inside, the in-folding area IFA of the back plate 140 has a cross-section of an omega (Ω) shape due to the plurality of holes 142a of the plate top 142 of the back plate 140. As a result, the cover window 130 and the display panel 120 have a cross-section of an omega shape.

The folding stress has a maximum value in the folding shoulder area FSA of the border between the in-folding area IFA where the deformation of the back plate 140 occurs and the non-folding area NFA where deformation of the back plate 140 does not occur.

The two second guides 154 may slide from the two first guides 152, respectively, and contact both side surfaces of the omega shape of the in-folding area IFA of the back plate 140 to support the back plate 140.

The third guide 156 may contact an inner surface of the case 150 and a lower surface of the omega shape of the in-folding area IFA of the back plate 140 to support the back plate 140.

In FIG. 3B, during the out-folding operation where the display surface of the display panel 120 is exposed outside, the out-folding area OFA of the back plate 140 has a cross-section of a U shape due to the at least one groove 146a of the plate bottom 146 of the back plate 140. As a result, the cover window 130 and the display panel 120 have a cross-section of a U shape.

The two second guides 154 may slide to the two first guides 152, respectively, and may be separated from the back plate 140.

The third guide 156 is separated from the inner surface of the case 150 and contacts the U shape of the out-folding area OFA of the back plate 140 to support the back plate 140.

The plurality of holes 142a of the plate top 142 of the back plate 140 of the foldable display device 110 will be illustrated further with reference to drawings.

Figure 4:
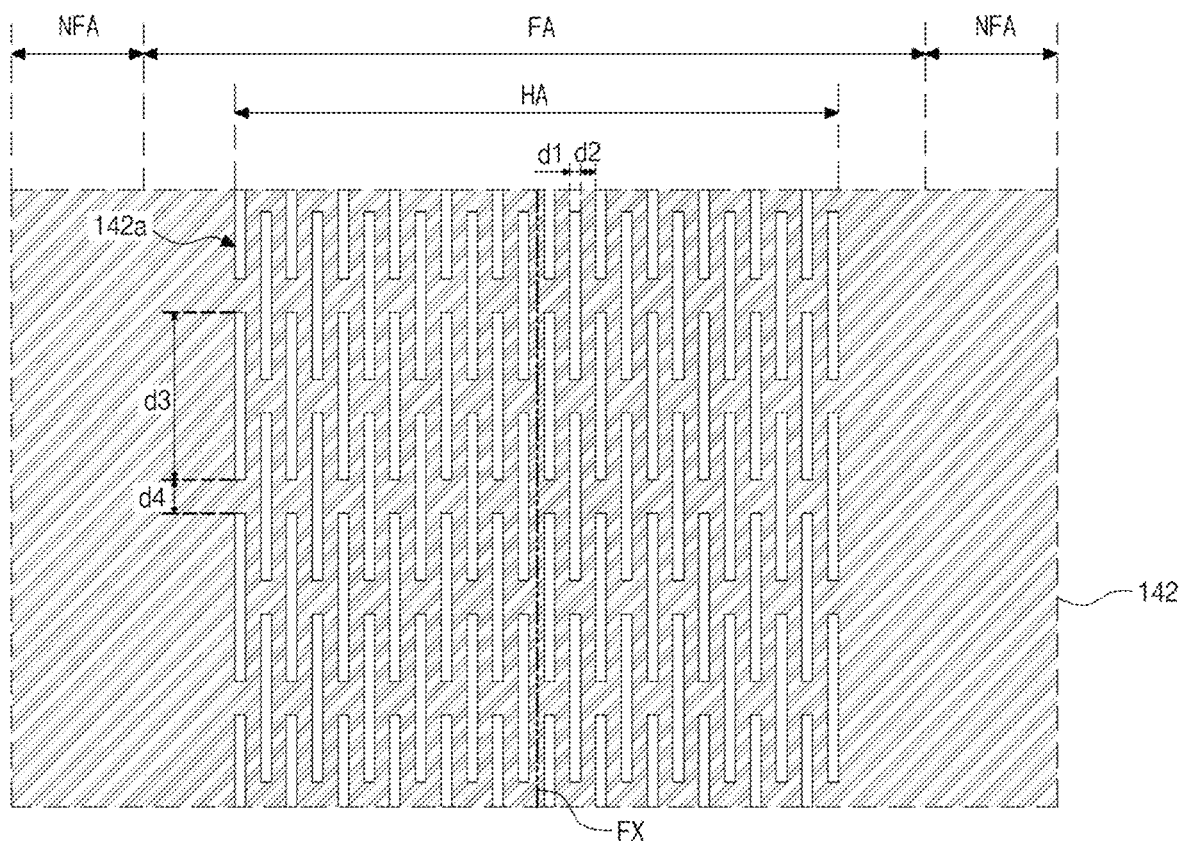
FIG. 4 is a plan view showing a plate top of a back plate of a foldable display device according to a first example embodiment of the present disclosure.

FIG. 4 is a plan view showing a plate top of a back plate of a foldable display device according to a first example embodiment of the present disclosure.

In FIG. 4, the plate top 142 of the back plate 140 of the foldable display device 110 according to a first example embodiment of the present disclosure may include the plurality of holes 142a disposed in the hole area HA.

The plurality of holes 142a provides flexibility to the plate top 142 during the folding operation such that the plate top 142 is flexibly bent. The plurality of holes 142a absorb a compressive stress and a tensile stress of the folding operation so that the plate top 142 can be easily restored to an original shape.

Each of the plurality of holes 142a may include a rectangular shape. The plurality of holes 142a may be separated from each other and disposed in matrix. The holes 142a in adjacent two rows may be disposed to partially overlap each other, and the holes 142a in adjacent two columns may be disposed to be separated from each other.

A first distance d1 which is a width of a short side of the rectangular shape of each hole 142a may be equal to or smaller than a second distance d2 which is a separation distance between long sides of the rectangular shapes of adjacent two holes 142a. (d1≤d2) A third distance d3 which is a width of the long side of the rectangular shape of each hole 142a may be greater than a fourth distance d4 which is a separation distance between the short sides of the rectangular shape of adjacent two holes 142a. (d3>d4)

For example, each of the first and second distances d1 and d2 may be within a range of about 20 μm to about 500 μm (preferably, a range of about 50 μm to about 300 μm), and each of the third and fourth distances d3 and d4 may be within a range of about 0.1 mm to about 10 mm (preferably, a range of about 0.5 mm to about 7 mm).

When one of the first and second distances d1 and d2 is smaller than about 20 μm or greater than about 500 μm and one of the third and fourth distances d3 and d4 is smaller than about 0.1 mm or greater than about 10 mm, the flexibility of the hole area HA of the plate top 142 is reduced. As a result, a folding property may be deteriorated, or the display panel 120 may become deformed.

Although the long side of the rectangular shape of each hole 142a is disposed along a direction parallel to the folding axis FX in FIG. 4, the long side of the rectangular shape of each hole 142a may be disposed along a direction perpendicular to the folding axis FX in another embodiment.

The plurality of holes may have various shapes and be disposed in various ways in another embodiment.

Figure 5:
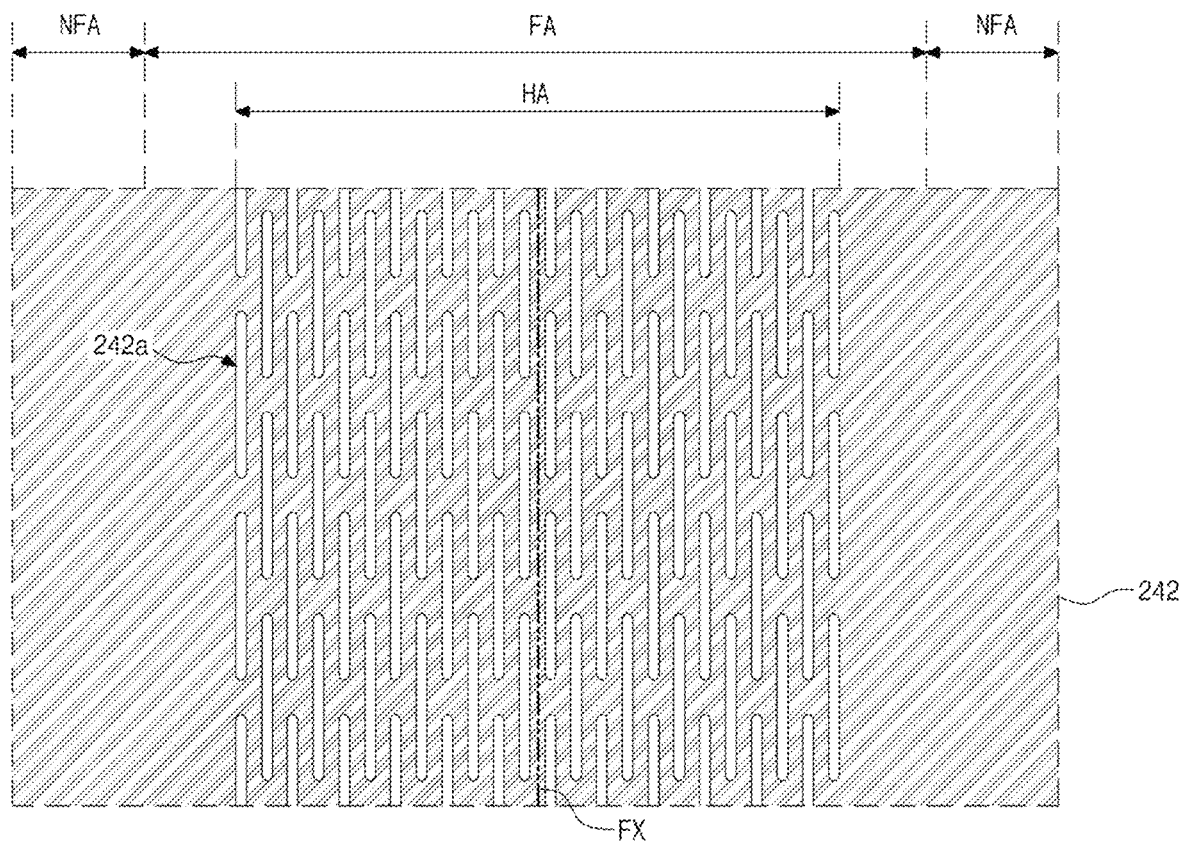
FIGS. 5 to 7 are examples of plan views showing a plate top of a back plate of a foldable display device according to second to fourth example embodiments, respectively, of the present disclosure.
Figure 6:
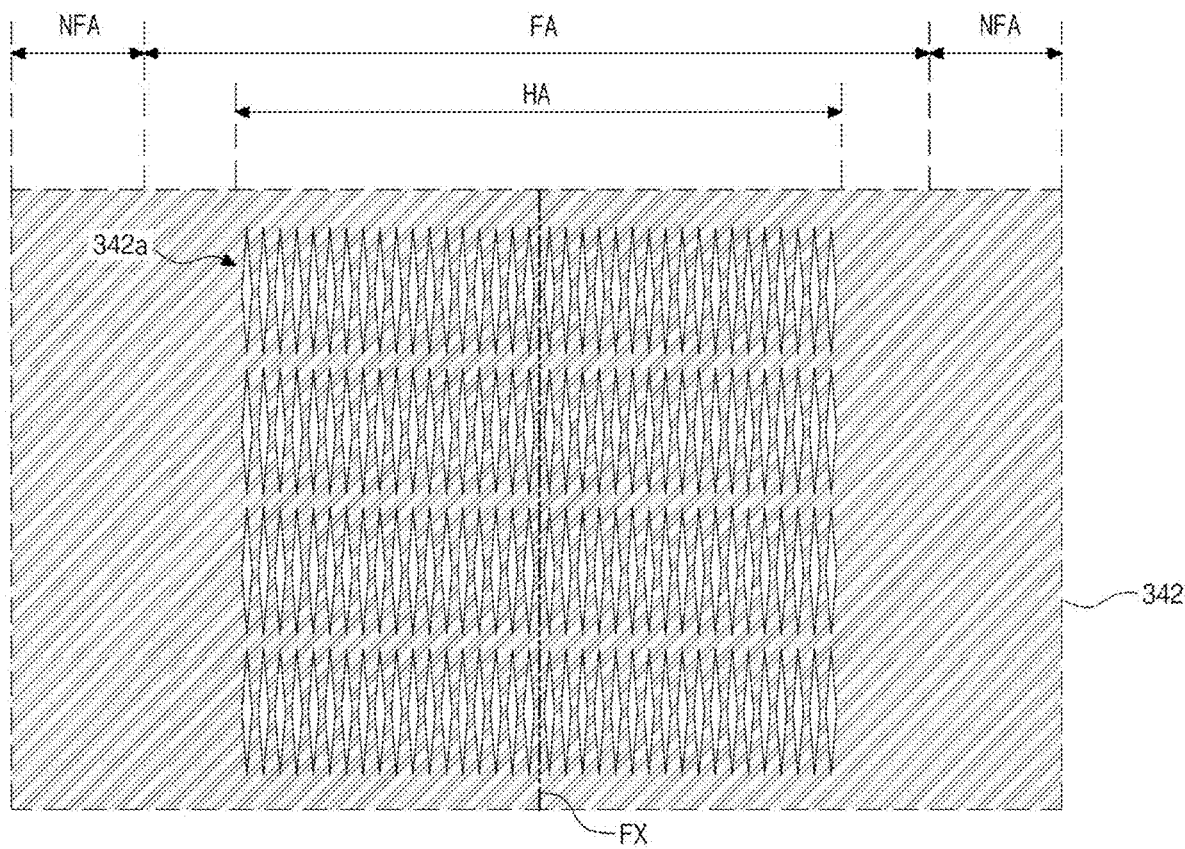
Figure 7:
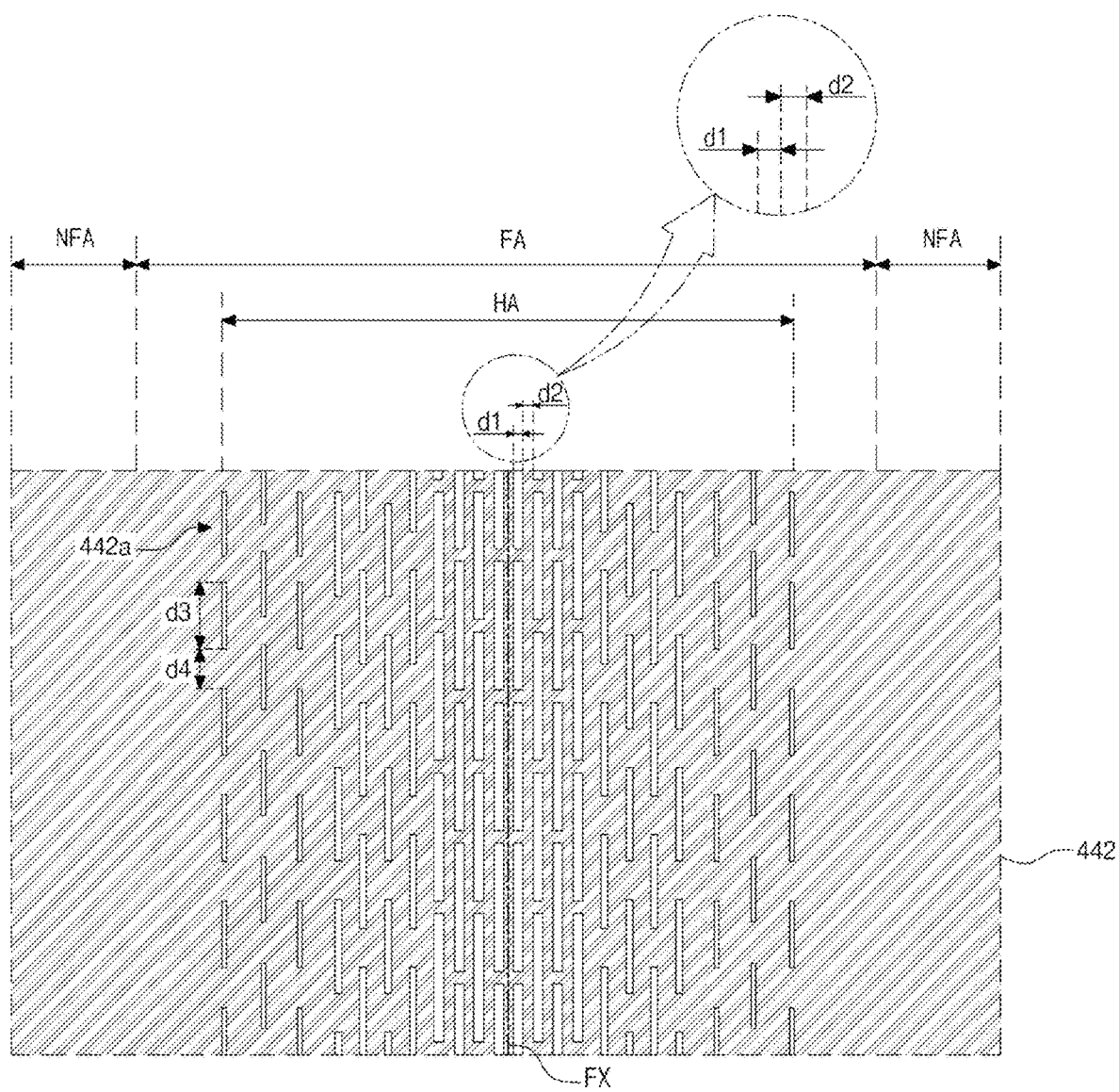

FIGS. 5 to 7 are examples of plan views showing a plate top of a back plate of a foldable display device according to second to fourth example embodiments, respectively, of the present disclosure. For the elements shown in FIGS. 5 to 7 that are substantially the same or similar to the elements described with respect to the first example embodiment, their detailed descriptions may be omitted or shortened for brevity.

In FIG. 5, a plate top 242 of a back plate of a foldable display device according to a second example embodiment of the present disclosure may include a plurality of holes 242a in a hole area HA.

Each of the plurality of holes 242a may have a rectangular shape having round corners or an elliptical shape having a minor axis of a constant length.

The shape of the plurality of holes 242a and the relationship of the first to fourth distances of the second embodiment may be the same as or substantially similar to those of the first example embodiment.

In FIG. 6, a plate top 342 of a back plate of a foldable display device according to a third example embodiment of the present disclosure may include a plurality of holes 342a in a hole area HA.

Each of the plurality of holes 342a may have a lozenge shape, and the plurality of holes 342a may be disposed in matrix and separated from each other. The holes 342a in adjacent two rows may be disposed to be separated from each other, and the holes 342a in adjacent two columns may be disposed to be separated from each other.

Although a major axis of the lozenge shape of each hole 342a is disposed along a direction parallel to a folding axis FX in FIG. 6, the major axis of the lozenge shape of each hole 342a may be disposed along a direction perpendicular to the folding axis FX in another embodiment.

In FIG. 7, a plate top 442 of a back plate of a foldable display device according to a fourth example embodiment of the present disclosure may include a plurality of holes 442a in a hole area HA.

Each of the plurality of holes 442a may have a rectangular shape, and the plurality of holes 442a may be disposed in matrix and separated from each other. The holes 442a in adjacent two rows may be disposed to overlap each other, and the holes 442a in adjacent two columns may be disposed to be separated from each other.

Each of a second distance d2 which is a separation distance between long sides of the rectangular shape of the adjacent two holes 442a and a fourth distance d4 which is a separation distance between short sides of the rectangular shape of the adjacent two holes 442a may decrease from an edge portion to a central portion of the hole area HA along a direction perpendicular to a folding axis FX. Further, each of a first distance d1 which is a width of a short side of the rectangular shape of each hole 442a and a third distance d3 which is a width of a long side of the rectangular shape of each hole 442a may increase from the edge portion to the central portion of the hole area HA along the direction perpendicular to the folding axis FX.

The plurality of holes 442a may be disposed such that a rigidity of the plate top 442 decreases from the edge portion to the central portion of the hole area HA along the direction perpendicular to the folding axis FX.

The stress in the folding shoulder area may be reduced and the omega shape may be obtained by adjusting the width of the hole area in the first to fourth example embodiments.

Figure 8:
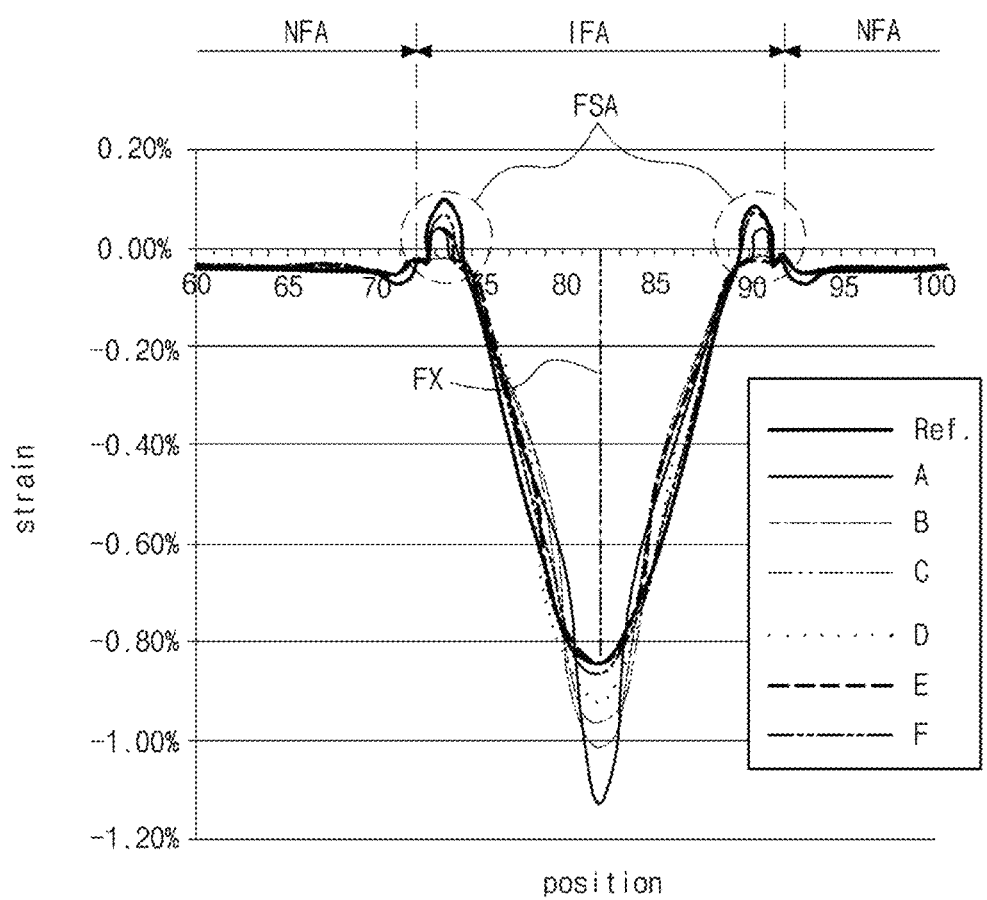
FIG. 8 is a graph showing a strain of a cover window according to widths of a hole area of a back plate of a foldable display device according to a first example embodiment of the present disclosure.

FIG. 8 is a graph showing a strain of a cover window according to widths of a hole area of a back plate of a foldable display device according to a first example embodiment of the present disclosure, and FIG. 9 is a table showing rendering of an omega shape according to widths of a hole area of a back plate of a foldable display device according to a first example embodiment of the present disclosure.

In FIGS. 8 and 9, a reference (Ref) sample includes a back plate without a plurality of holes, and A, B, C, D, E and F samples have the first widths w1 of the hole area HA of about 1.1 mm, about 2.9 mm, about 4.3 mm, about 5.9 mm, about 9.89 mm and about 15.89 mm, respectively.

For the reference (Ref.) sample and the A, B, C, D, E and F samples, an in-folding operation where a radius of curvature of the in-folding area IFA is within a range of 1 R (1 mm) to 3 R (3 mm) and an out-folding operation where a radius of curvature of the out-folding area OFA is within a range of 3 R (3 mm) to 5 R (5 mm) are performed. During the in-folding operation, the cover window 130 of the reference (Ref.) sample and the A, B, C, D, E and F samples has a strain other than 0 in the in-folding area IFA, a strain of 0 in the non-folding area NFA and a negative strain of a maximum absolute value at the folding axis FX.

Further, the reference (Ref.) sample and the A, B, C, D, E and F samples have tensile strains of about 0.1%, about 0.04%, about 0%, about 0%, about 0%, about 0.05% and about 0.07%, respectively.

During the in-folding operation, the strain of the reference (Ref.) sample and the A, B, C, D, E and F samples decreases from the folding axis FX to the edge portion of the in-folding area IFA.

While the folding stress is focused on the folding shoulder area FSA in the reference (Ref.) sample and the A, E and F samples, the folding stress is not focused on the folding shoulder area FSA in the B, C and D samples and is minimized.

The folding shoulder area FSA of the cover window 130 of the reference (Ref.) sample and the A, B, C, D, E and F samples have the tensile strain of about 0.1%, about 0.04%, about 0%, about 0%, about 0%, about 0.05% and about 0.07%, respectively.

The transparent adhesive layer of the reference (Ref.) sample and the A, B, C, D, E and F samples have the maximum strain of about 133%, about 113%, about 112%, about 112%, about 113%, about 117% and about 119%, respectively.

During the in-folding operation, the reference (Ref.) sample does not produce an omega shape, the A, E and F samples do not produce a normal omega shape, and the B, C and D samples produce a normal omega shape.

As a result, in the foldable display device 110 according to a first example embodiment of the present disclosure, the first width w1 of the hole area HA of the plate top 142 of the back plate 140 may be within a range of about 2.5 mm to about 6.5 mm.

When the first width w1 of the hole area HA of the plate top 142 of the back plate 140 is within a range of about 2.5 mm to about 6.5 mm, the omega shape may be obtained without the first, second and third guides 152, 154 and 156 (of FIG. 3A) during the in-folding operation. When the first width w1 of the hole area HA of the plate top 142 of the back plate 140 is greater than about 6.5 mm, the omega shape may be obtained by using the first, second and third guides 152, 154 and 156 during the in-folding operation.

In the foldable display device 110 according to the first to fourth example embodiments of the present disclosure, the plurality of holes 142a may be disposed in the hole area HA of the plate top 142 of the back plate 140, and the at least one groove 146a may be disposed in the groove area GA of the plate bottom 146 of the back plate 140. As a result, a transfer of deformation due to the folding stress to the cover window 130 and the display panel 120 may be minimized, and the reproduction accuracy to the original shape may be improved.

In addition, the stress of the folding shoulder area FSA may be minimized by adjusting the width of the hole area HA of the plate top 142 of the back plate 140. As a result, the normal omega shape may be obtained during the in-folding operation.

In another embodiment, a resin layer for absorbing an impact may be disposed in a groove of a plate bottom.

Figure 10:
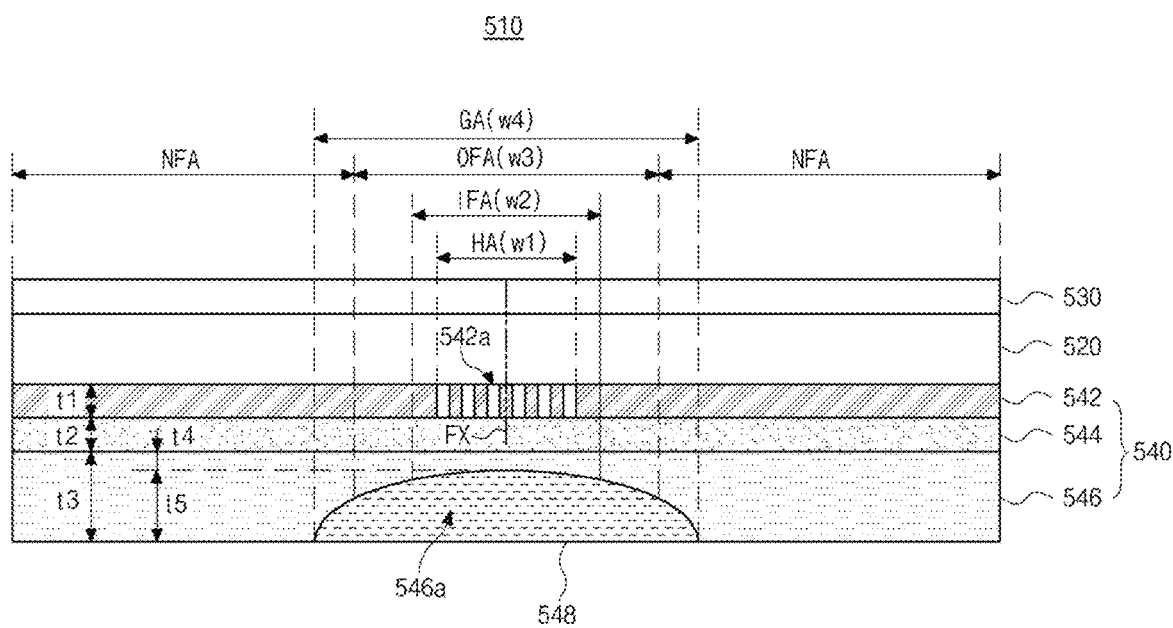
FIG. 10 is a cross-sectional view showing a foldable display device according to a fifth example embodiment of the present disclosure.

FIG. 10 is a cross-sectional view showing a foldable display device according to a fifth example embodiment of the present disclosure. For the elements shown in FIG. 10 that are substantially the same or similar to the elements described with respect to the first example embodiment, their detailed descriptions may be omitted or shortened for brevity.

In FIG. 10, a foldable display device 510 according to a fifth example embodiment of the present disclosure may include a display panel 520, a cover window 530, a back plate 540 and a resin layer 548.

The back plate 540 may support the display panel 520 and protect the display panel 520 from an external impact, an external moisture and an external heat. The back plate 540 may include a plate top 542, an adhesive layer 544 and a plate bottom 546 sequentially disposed under the display panel 520.

The plate top 542 may include a plurality of holes 542a symmetrically disposed with respect to the folding axis FX in a hole area HA. The hole area HA may produce the in-folding area IFA which has a rigidity relatively lower than the non-folding area NFA due to the plurality of holes 542a and is bent during the in-folding operation.

The plate bottom 546 may include at least one groove 546a symmetrically disposed in a groove area GA with respect to the folding axis FX. The groove area GA may have a relatively low rigidity as compared with the non-folding area NFA due to the at least one groove 546a and may produce the out-folding area OFA which is bent during the out-folding operation.

The plate bottom 546 may include a material having a relatively high elastic modulus. For example, the plate bottom 546 may include the same type of material as the plate top 542 but in a different alloy composition ratio.

The resin layer 548 may be disposed in the at least one groove 546a of the plate bottom 546. The resin layer 548 may include a soft resin and absorb an external impact to protect the display panel 520 and the back plate 540.

In the foldable display device 510 according to a fifth example embodiment of the present disclosure, the plurality of holes 542a may be disposed in the hole area HA of the plate top 542 of the back plate 540 and the at least one groove 546a may be disposed in the groove area GA of the plate bottom 546 of the back plate 540. As a result, a transfer of deformation due to the folding stress to the cover window 530 and the display panel 520 may be minimized, and the reproduction accuracy to the original shape may be improved.

In addition, the stress of the folding shoulder area FSA may be minimized by adjusting the width of the hole area HA of the plate top 542 of the back plate 540. As a result, the normal omega shape can be obtained during the in-folding operation.

Further, since the resin layer 548 of a soft resin is disposed in the at least one groove 546a of the plate bottom 546, the display panel 520 and the back plate 540 may be protected from an external impact.

In another embodiment, a plurality of grooves may be formed in a plate bottom.

Figure 11:
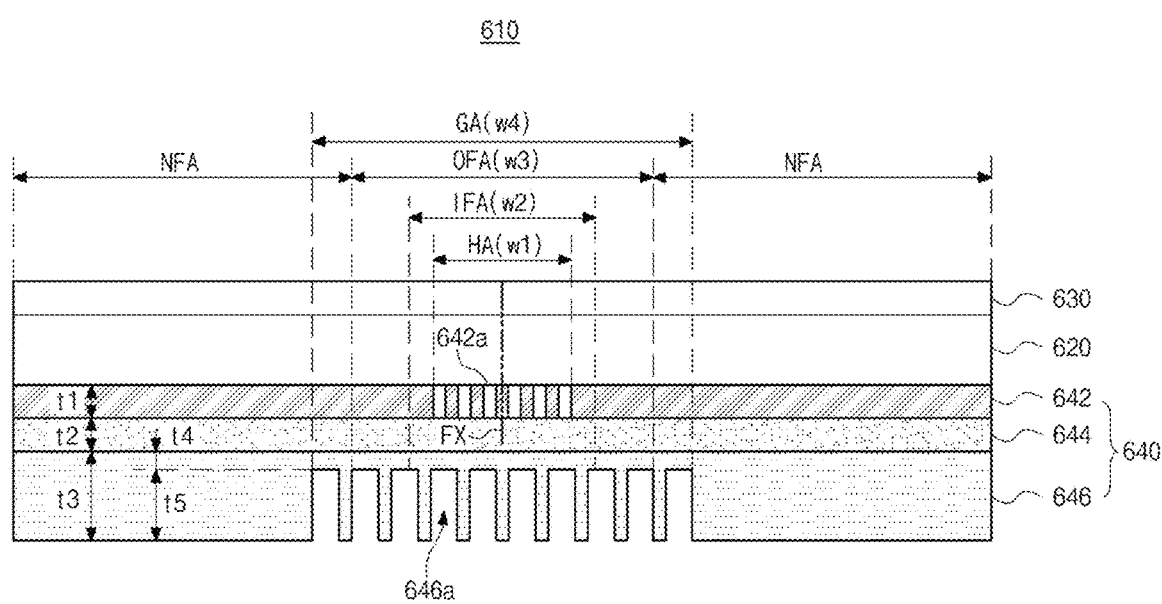
FIG. 11 is a cross-sectional view showing a foldable display device according to a sixth example embodiment of the present disclosure.

FIG. 11 is a cross-sectional view showing a foldable display device according to a sixth example embodiment of the present disclosure. For the elements shown in FIG. 11 that are substantially the same or similar to the elements described with respect to the first example embodiment, their detailed descriptions may be omitted or shortened for brevity.

In FIG. 11, a foldable display device 610 according to a sixth example embodiment of the present disclosure may include a display panel 620, a cover window 630, and a back plate 640.

The back plate 640 may support the display panel 620 and protect the display panel 620 from an external impact, an external moisture and an external heat. The back plate 640 may include a plate top 642, an adhesive layer 644 and a plate bottom 646 sequentially disposed under the display panel 620.

The plate top 642 may include a plurality of holes 642a symmetrically disposed with respect to the folding axis FX in a hole area HA. The hole area HA may produce the in-folding area IFA which has a rigidity relatively lower than the non-folding area NFA due to the plurality of holes 642a and is bent during the in-folding operation.

The plate bottom 646 may include a plurality of grooves 646a symmetrically disposed in a groove area GA with respect to the folding axis FX. The groove area GA may have a relatively low rigidity as compared with the non-folding area NFA due to the plurality of grooves 646a and may produce the out-folding area OFA which is bent during the out-folding operation.

The plurality of grooves 646a may have a same fifth thickness t5 which is a depth thereof as each other.

The plurality of grooves 646a of the plate bottom 646 may have a shape corresponding to the plurality of holes 642a of the plate top 642.

For example, each of the plurality of grooves 646a of the plate bottom 646 may have one of a rectangular shape, a rectangular shape having round corners or an elliptical shape having a minor axis of a constant length and a lozenge shape. A separation distance between the grooves 626a may decrease and a width of the groove 626a may increase from an edge portion to a central portion of the groove area GA.

The plate bottom 646 may include a material having a relatively high elastic modulus. For example, the plate bottom 646 may include the same type of material as the plate top 642 but in a different alloy composition ratio.

In the foldable display device 610 according to a sixth example embodiment of the present disclosure, the plurality of holes 642a may be disposed in the hole area HA of the plate top 642 of the back plate 640, and the plurality of grooves 646a may be disposed in the groove area GA of the plate bottom 646 of the back plate 640. As a result, a transfer of deformation due to the folding stress to the cover window 630 and the display panel 620 may be minimized, and the reproduction accuracy to the original shape may be improved.

In addition, the stress of the folding shoulder area FSA may be minimized by adjusting the width of the hole area HA of the plate top 642 of the back plate 640. As a result, the normal omega shape may be obtained during the in-folding operation.

Consequently, in the foldable display device according to the first to sixth example embodiment of the present disclosure, since the plurality of holes are disposed in the plate top of the back plate and at least one groove is disposed in the plate bottom of the back plate, a transfer of deformation due to the folding stress to the display panel can be minimized, the reproduction accuracy to the original shape can be improved, and the bidirectional folding can be thus obtained.

Further, since the widths of the hole area, the in-folding area and the out-folding area of the back plate can be adjusted, the normal omega shape can be obtained during the in-folding operation and the stress in the folding shoulder area can be minimized.

It will be apparent to those skilled in the art that various modifications and variations can be made in the present disclosure without departing from the scope of the present disclosure. Thus, it is intended that the present disclosure covers the modifications and variations of this disclosure provided they come within the scope of the appended claims and their equivalents.

What is claimed is:

1. A foldable display device, comprising:
a display panel displaying an image;
a cover window over the display panel; and
a back plate under the display panel, the back plate including a plate top having a plurality of holes, a plate bottom having at least one groove corresponding to the plurality of holes, and an adhesive layer attaching the plate top and the plate bottom,
wherein a portion of the plate bottom remains in a groove area corresponding to the at least one groove.

2. The foldable display device of claim 1, wherein the back plate includes a hole area corresponding to the plurality of holes, an in-folding area that is a bending portion of an in-folding operation with reference to a folding axis, an out-folding area that is a bending portion of an out-folding operation opposite to the in-folding operation, a non-folding area outside the out-folding area, and the groove area corresponding to the at least one groove.

3. The foldable display device of claim 2, wherein the hole area, the in-folding area, the out-folding area, and the groove area have first, second, third and fourth widths, respectively, along a direction perpendicular to the folding axis,
wherein the second width is greater than the first width and smaller than the third width, and
wherein the fourth width is equal to or greater than the third width and is equal to or smaller than 1.2 times the third width.

4. The foldable display device of claim 3, wherein the first width is within a range of 2.5 mm to 6.5 mm.

5. The foldable display device of claim 1, wherein a first thickness of the plate top is within a range of 10 μm to 100 μm, wherein a second thickness of the adhesive layer is within a range of 5 μm to 100 μm, wherein a third thickness of the plate bottom is within a range of 10 μm to 200 μm, and wherein a fourth thickness of a minimum thickness of the plate bottom due to the at least one groove is equal to or smaller than a fifth thickness of a maximum depth of the at least one groove.

6. The foldable display device of claim 1, wherein each of the plurality of holes has one of a rectangular shape, a rectangular shape having round corners, an elliptical shape having a minor axis of a constant length, and a lozenge shape.

7. The foldable display device of claim 2, wherein a separation distance between adjacent two of the plurality of holes along a direction parallel to the folding axis decreases from an edge portion to a central portion of the hole area along the direction perpendicular to the folding axis, wherein a separation distance between adjacent two of the plurality of holes along a direction perpendicular to the folding axis decreases from the edge portion to the central portion of the hole area along the direction perpendicular to the folding axis, wherein a width of the plurality of holes along the direction parallel to the folding axis increases from the edge portion to the central portion of the hole area along the direction perpendicular to the folding axis, and wherein a width of the plurality of holes along the direction perpendicular to the folding axis increases from the edge portion to the central portion of the hole area along the direction perpendicular to the folding axis.

8. The foldable display device of claim 1, further comprising a resin layer in the at least one groove.

9. The foldable display device of claim 1, wherein the at least one groove includes a plurality of grooves having a same depth as each other.

10. A foldable display device, comprising:
a display panel displaying an image;
a plate top under the display panel, the plate top including a plurality of holes; and
a plate bottom under the plate top, the plate bottom including at least one groove corresponding to the plurality of holes,
wherein the plate top and the plate bottom have a cross-section of an omega shape in an in-folding operation where a display surface of the display panel is hidden inside with reference to a folding axis, and
wherein the plate top and the plate bottom have a cross-section of a U shape in an out-folding operation where the display surface of the display panel is exposed outside with reference to the folding axis.

11. The foldable display device of claim 10, wherein a hole area corresponding to the plurality of holes has a first width along a direction perpendicular to the folding axis, wherein an in-folding area that is a bending portion of the in-folding operation has a second width along the direction perpendicular to the folding axis, wherein an out-folding area that is a bending portion of the out-folding operation has a third width along the direction perpendicular to the folding axis, wherein a groove area corresponding to the at least one groove has a fourth width along the direction perpendicular to the folding axis, wherein the second width is greater than the first width and is smaller than the third width, and wherein the fourth width is equal to or greater than the third width and is equal to or smaller than 1.2 times the third width.

12. A foldable display device, comprising:
a display panel configured to display an image; and
a back plate under the display panel, the back plate including:
a plate top having a plurality of holes disposed in a hole area;
a plate bottom having a plurality of grooves disposed in a groove area; and
an adhesive layer bonding the plate top and the plate bottom,
wherein the foldable display device performs bidirectional folding with respect to a folding axis.

13. The device of claim 12, wherein each of the plurality of grooves has one of a rectangular shape, a rectangular shape having round corners, an elliptical shape having a minor axis of a constant length and a lozenge shape.

14. The device of claim 12, wherein a separation distance between adjacent two of the plurality of grooves along a direction perpendicular to the folding axis decreases from an edge portion to a central portion of the groove area along the direction perpendicular to the folding axis, and wherein a width of the groove along the direction perpendicular to the folding axis increases from the edge portion to the central portion of the groove area along the direction perpendicular to the folding axis.

15. The foldable display device of claim 1, wherein a width of the groove area is greater than a width of a hole area corresponding to the plurality of holes.

16. The foldable display device of claim 2, wherein a boundary of the groove area where the at least one groove begins is disposed in the non-folding area.

* * * * *